United States Patent
Qi et al.

(10) Patent No.: US 11,017,219 B2
(45) Date of Patent: May 25, 2021

(54) METHOD AND APPARATUS FOR DETECTING HUMAN BODY GENDER IN MICROWAVE IMAGE

(71) Applicants: SHENZHEN VICTOOTH TERAHERTZ TECHNOLOGY CO., LTD, Shenzhen (CN); CHINA COMMUNICATION TECHNOLOGY CO., LTD., Shenzhen (CN)

(72) Inventors: Chunchao Qi, Shenzhen (CN); Zhiquan Li, Shenzhen (CN); Hanjiang Chen, Shenzhen (CN); Guangsheng Wu, Shenzhen (CN); Shukai Zhao, Shenzhen (CN); Qing Ding, Shenzhen (CN)

(73) Assignees: SHENZHEN VICTOOTH TERAHERTZ TECHNOLOGY CO., LTD, Guangdong Province (CN); CHINA COMMUNICATION TECHNOLOGY CO., LTD, Guangdong Province (CN)

( * ) Notice: Subject to any disclaimer, the term of this patent is extended or adjusted under 35 U.S.C. 154(b) by 0 days.

(21) Appl. No.: 16/305,839

(22) PCT Filed: May 17, 2017

(86) PCT No.: PCT/CN2017/084631
§ 371 (c)(1),
(2) Date: Nov. 29, 2018

(87) PCT Pub. No.: WO2017/215393
PCT Pub. Date: Dec. 21, 2017

(65) Prior Publication Data
US 2019/0138802 A1 May 9, 2019

(30) Foreign Application Priority Data

Jun. 13, 2016 (CN) .......................... 201610410080.7

(51) Int. Cl.
*G06K 9/00* (2006.01)
*G06T 11/00* (2006.01)
(Continued)

(52) U.S. Cl.
CPC ....... *G06K 9/00369* (2013.01); *G06K 9/4642* (2013.01); *G06T 7/62* (2017.01);
(Continued)

(58) Field of Classification Search
CPC .... G06K 9/00369; G06K 9/4642; G06T 7/62; G06T 7/74; G06T 11/00; G06T 2207/20072; G06T 2207/30196
(Continued)

(56) References Cited

U.S. PATENT DOCUMENTS 8,605,148 B2 * 12/2013 Robertson .............. H04N 5/275
348/135
9,317,785 B1 * 4/2016 Moon ................ G06K 9/00234
(Continued)

FOREIGN PATENT DOCUMENTS

| CN | 101639349 | 2/2010 |
| CN | 102540264 | 7/2012 |

(Continued)

*Primary Examiner* — Jonathan S Lee
(74) *Attorney, Agent, or Firm* — Jason P. Mueller; FisherBroyles, LLP

(57) ABSTRACT

This invention relates to a method and a device for human body gender detection in a microwave image. The structure feature of a human body itself as well as the constructed vertical direction spatial distribution histogram and horizontal direction spatial distribution histogram are used to accurately locate the chest position and the crotch position of the (Continued)

human body. A human body chest subimage is extracted according to the chest position, and a human body crotch subimage is extracted according to the crotch position. Then, the feature values of the human body chest subimage and the human body crotch subimage are respectively extracted by a feature value extraction algorithm, and the human body gender is automatically identified according to the feature values. The technical solution of this invention is simple, and after experimental verification, can be effectively applied in actual microwave security check system. This technical solution has high real time and high robustness, and its correct recognition rate meets the operating requirements. As such, the problem of how to identify human body gender in real time and accurately in a microwave security check system is solved. Besides, because the present invention can accurately locate the chest position and the crotch position of a human body, the human body's private part can be shielded and protected effectively according to this invention.

13 Claims, 5 Drawing Sheets

(51) Int. Cl.
*G06T 7/62* (2017.01)
*G06T 7/73* (2017.01)
*G06K 9/46* (2006.01)

(52) U.S. Cl.
CPC ................ *G06T 7/74* (2017.01); *G06T 11/00* (2013.01); *G06T 2207/20072* (2013.01); *G06T 2207/30196* (2013.01)

(58) Field of Classification Search
USPC ........................................................ 382/103
See application file for complete search history.

(56) References Cited

U.S. PATENT DOCUMENTS

| | | | |
|---|---|---|---|
| 9,589,205 B2* | 3/2017 | Joshi | G06K 9/00 |
| 9,591,364 B2* | 3/2017 | Kinoshita | H04N 5/23216 |
| 10,225,462 B2* | 3/2019 | Murakami | H04N 5/23219 |
| 2002/0031246 A1 | 3/2002 | Kawano | |

FOREIGN PATENT DOCUMENTS

| | | |
|---|---|---|
| CN | 102567733 | 7/2012 |
| CN | 105556508 | 5/2016 |
| CN | 106127732 | 11/2016 |

* cited by examiner

METHOD AND APPARATUS FOR DETECTING HUMAN BODY GENDER IN MICROWAVE IMAGE

This application is a national stage entry under 35 U.S.C. 371 of PCT Patent Application No. PCT/CN2017/084631, filed May 17, 2017, which claims priority to Chinese Patent Application No. 201610410080.7, filed Jun. 13, 2016, the entire contents of each of which is incorporated herein by reference.

TECHNICAL FIELD

Aspects of the present disclosure relate to the technical field of image processing, and more particularly, to a method for human body gender detection in a microwave image and a device for human body gender detection in a microwave image.

BACKGROUND

Microwave has penetrability during transmitting. An object imaging result image covered by the scanned person's clothes by microwave imaging technology. Based on microwave image, hazardous items hidden in the scanned person's clothes, such as metal instruments, ceramic cutting tool, unidentified liquid and powder, can be discovered effectively. However, the scanned persons' legal rights should be respected during security check, and some measures should be taken to protect the scanned persons' privacy information. Therefore, when processing images in back end, a scanner masks privacy and displays detection results in the cartoon form in the front end. Because of the male and female' gender difference, the shielding measures are different. At present, the solution in security check products is that, before detecting a target to be detected, the gender information of the target to be detected is manually inputted by a staff member. This solution increases the member's workload and the detection process's complexity.

If uncooperative, the spatial position of the detection space where the target to be detected stands during the detection process is random. Furthermore, there is a great difference in the height, body type and gesture of every target to be detected. Realizing automatic spatial positioning and automatic gender detection and classification for the target to be detected in a microwave image is an important technology worth studying.

The significant differences between male and female are generally reflected in physical characteristic and clothing. These differences can be shown clearly in a visible light image. Since the resolution of visible light is very high, the physical characteristic and clothing in an image has a high gray scale and rich texture information, which can be detected and processed based on Haar feature, gray matching and Histogram of Oriented Gradient (HOG). However, in the security check system field of microwave imaging, the above methods do not apply, and the reasons are as follows:

1) There is natural difference in imaging mechanism of microwave image and that of visible light image, and the difference of imaging quality is big. The gray scale of microwave image is low and the resolution is low, and is influenced by multiplicative speckle noise. The methods, such texture feature extraction and face detection, applied in a visible light image, cannot be applied in a microwave image.

2) The security check system based on microwave imaging has high demands for privacy detection, automatically distinguishing operation time and memory space efficiency. In existing HOG feature, etc., the feature variable's dimension is too high in calculation, which cannot meet the real time requirement in a microwave security check system.

In addition, during security check, in order to make the detected person to accept easily, it is impossible to have strict constraints and requirements to the detected person on standing position, standing gesture, limbs position and gesture. The detection is generally deemed as a non-cooperative situation, and during security check, human body carrying foreign matter is unknown. In non-cooperative situation and influenced by the imaging interference factor of the detected target carrying unknown items, microwave image human body gender detection method based on complex rules has inferior effect.

SUMMARY

In view of the above, with respect to the above problems, it is necessary to provide a method and a device for human body gender detection in a microwave image, which has simple rules and can perform accurate and real-time detection on human body gender in a microwave image.

In order to achieve the above objective, the present disclosure proposes the following technical solutions.

A method for human body gender detection in a microwave image, comprising:

acquiring a grayscale microwave image comprising human body detection results, and obtaining a human body profile image from the grayscale microwave image;

constructing a vertical direction spatial distribution histogram of the human body profile image, and obtaining horizontal coordinate of human vertical middle line according to the vertical direction spatial distribution histogram;

constructing a horizontal direction spatial distribution histogram of the human body profile image, performing a local minimum detection on the horizontal direction spatial distribution histogram to obtain vertical coordinate of human body head and vertical coordinate of human body foot;

obtaining the human body height according to the vertical coordinate of human body head and the vertical coordinate of human body foot;

obtaining the position of human body chest and the position of human body crotch with respect to the human body vertical middle line according to human body part proportion and probability model, the human body height, the horizontal direction spatial distribution histogram and the vertical coordinate of human body head/the vertical coordinate of human body foot;

extracting a subimage of human body chest according to the horizontal coordinate of human body vertical middle line and the position of human body chest, and extracting a subimage of human body crotch according to the horizontal coordinate of human body vertical middle line and the position of human body crotch;

obtaining a chest feature value of the subimage of human body chest and a crotch feature value of the subimage of human body crotch, and detecting human body gender according to the chest feature value and the crotch feature value.

A device for human body gender detection in a microwave image, comprising:

a human body profile image acquiring module configured to acquire a grayscale microwave image comprising human body detection results, and obtain a human body profile image from the grayscale microwave image;

a vertical middle line horizontal coordinate obtaining module configured to construct a vertical direction spatial distribution histogram of the human body profile image, and obtain horizontal coordinate of human body vertical middle line according to the vertical direction spatial distribution histogram;

a head and foot coordinate obtaining module configured to construct a horizontal direction spatial distribution histogram of the human body profile image, perform a local minimum detection on the horizontal direction spatial distribution histogram to obtain vertical coordinate of human body head and vertical coordinate of human body foot;

a human body height obtaining module configured to obtain the human body height according to the vertical coordinate of human body head and the vertical coordinate of human body foot;

a chest and crotch position obtaining module configured to obtain the position of human body chest and the position of human body crotch with respect to the human body vertical middle line according to human body part proportion and probability model, the human body height, the horizontal direction spatial distribution histogram and the vertical coordinate of human body head/the vertical coordinate of human body foot;

a gender feature subimage extracting module configured to extract a subimage of human body chest according to the horizontal coordinate of human body vertical middle line and the position of human body chest, and extract a subimage of human body crotch according to the horizontal coordinate of human body vertical middle line and the position of human body crotch;

a gender detection module configured to obtain a chest feature value of the subimage of human body chest and a crotch feature value of the subimage of human body crotch, and detect human body gender according to the chest feature value and the crotch feature value.

In the method and device for human body gender detection in a microwave image according to this disclosure, the structure feature of a human body itself as well as the constructed vertical direction spatial distribution histogram and horizontal direction spatial distribution histogram are used to accurately locate the chest position and the crotch position of the human body. A human body chest subimage is extracted according to the chest position, and a human body crotch subimage is extracted according to the crotch position. Then, the feature values of the human body chest subimage and the human body crotch subimage are calculated, and the human body gender is automatically identified according to the feature values. The technical solution of this disclosure is simple, and after experimental verification, can be effectively applied in actual microwave security check system. This technical solution has high real time and high robustness, and its correct recognition rate meets the operating requirements. As such, the problem of how to identify human body gender in real time and accurately in a microwave security check system is solved. Besides, because the present disclosure can accurately locate the chest position and the crotch position of a human body, the human body's private part can be shielded and protected effectively according to this disclosure.

BRIEF DESCRIPTION OF THE ATTACHED DRAWINGS

Figure 9:
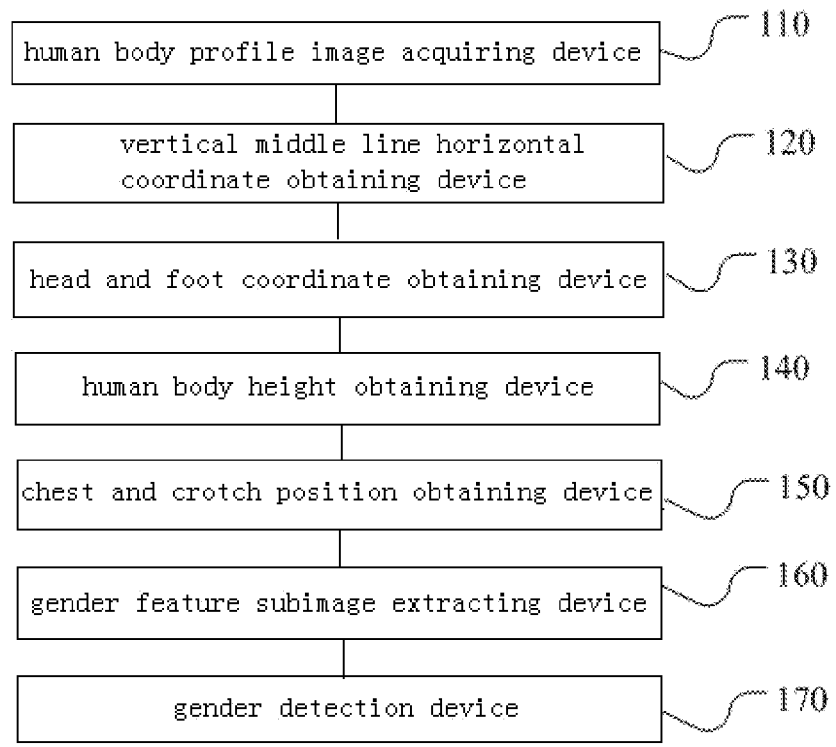

FIG. 9 a structure diagram of a device for human body gender detection in a microwave image according to an embodiment of this disclosure.

Figure 10:
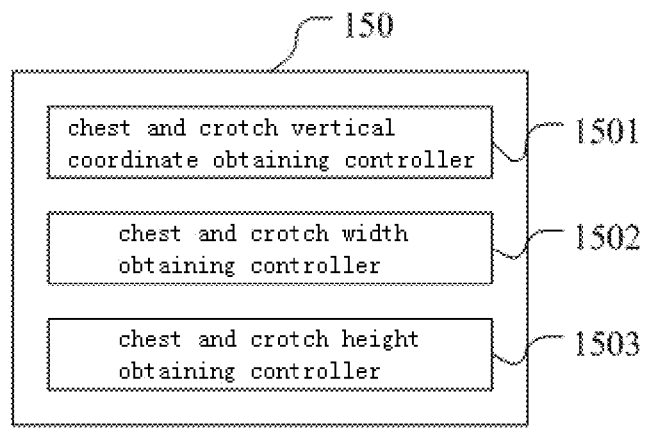

FIG. 10 a structure diagram of an embodiment of a chest and crotch position obtaining module according to this disclosure.

DETAILED DESCRIPTION

In a microwave security check system (e.g., a near field millimeter wave imaging security check system), after transmitting and receiving a microwave signal and performing imaging on the received signal, based on the image of microwave imaging, procedures such as automatically detecting foreign matters, automatically detecting and separately shielding the human body's private part, should be accomplished. Because of the male and female' gender difference, the shielding measures are different.

During near field microwave security check, automatic identification of human body gender generally comprises two aspects: first, the nondeterminacy of the standing spatial location during security check and the expressions in resulting image of human body echo signal imaging at different angles; second, determining the spatial vertical height positions and width sizes of human body chest and crotch. A microwave image signal is basically different from an optical image signal (such as in noise principle and gray level). The microwave security check is accomplished in combination of gray scale microwave image's feature of itself and human body's structural feature in the imaging result. Theoretical study and many experiments show that the human body's structural feature in a gray scale microwave image are as follows.

With respect to microwave signals, the dielectric constant of human skin is greater than that of fabric. When embodying this feature in a gray scale microwave image, the human body imaging gray information is greater than background imaging gray information. Even though the grayscale texture information in the human body region is inferior and the speckle noise is heavy, the human body structure is basically symmetrical in most of imaging angles, the head is upright, and the only differences are hands' placement location, posture, and face direction.

Based on the above characteristics, this disclosure can accurately locate the chest position and the crotch position of a human body by analyzing the accurate statistics of a microwave human body image and utilizing the structure feature of a human body itself. Then a feature extraction algorithm is used to automatically identify human body's gender. The technical solution according to this disclosure is targeted, has high robustness, and acquires good effects in practice.

In order to further elaborate the technical measures and the achieved technical effect of this disclosure, the technical solutions are described clearly and completely in combination with the appended figures and preferred embodiments. It should be noted that, the words "a first" and "a second" in the context are only used to distinguish an identical technical feature, and not to limit the order and the number of the technical feature.

Figure 1:
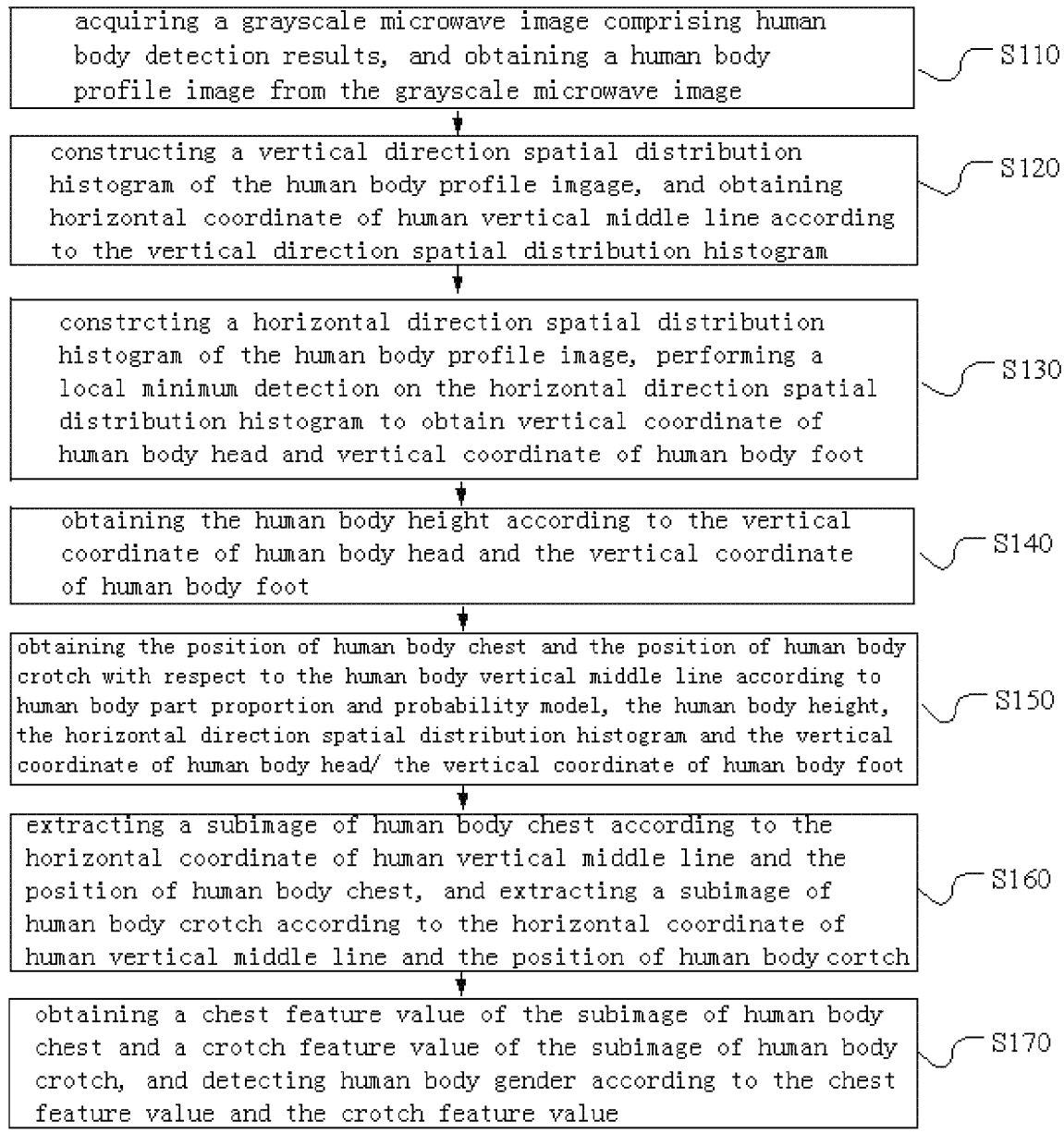
FIG. 1 illustrates a flow diagram of a method for human body gender detection in a microwave image according to an embodiment of this disclosure.

As illustrated in FIG. 1, a method for human body gender detection in a microwave image, comprising:

S110: acquiring a grayscale microwave image comprising human body detection results, and obtaining a human body profile image from the grayscale microwave image;

S120: constructing a vertical direction spatial distribution histogram of the human body profile image, and obtaining horizontal coordinate of human vertical middle line according to the vertical direction spatial distribution histogram;

S130: constructing a horizontal direction spatial distribution histogram of the human body profile image, performing a local minimum detection on the horizontal direction spatial distribution histogram to obtain vertical coordinate of human body head and vertical coordinate of human body foot;

S140: obtaining the human body height according to the vertical coordinate of human body head and the vertical coordinate of human body foot;

S150: obtaining the position of human body chest and the position of human body crotch with respect to the human body vertical middle line according to human body part proportion and probability model, the human body height, the horizontal direction spatial distribution histogram and the vertical coordinate of human body head/the vertical coordinate of human body foot;

S160: extracting a subimage of human body chest according to the horizontal coordinate of human vertical middle line and the position of human body chest, and extracting a subimage of human body crotch according to the horizontal coordinate of human vertical middle line and the position of human body crotch;

S170: obtaining a chest feature value of the subimage of human body chest and a crotch feature value of the subimage of human body crotch, and detecting human body gender according to the chest feature value and the crotch feature value.

Figure 2:
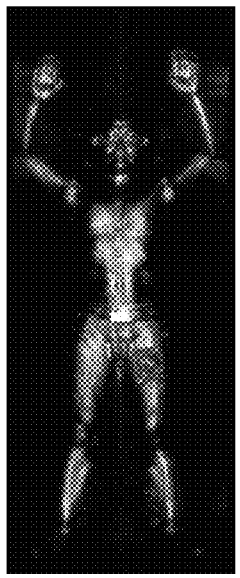
FIG. 2 illustrates a diagram of a specific embodiment of an inputted gray scale microwave image according to this disclosure.

In step S110, inputting a grayscale microwave image I (x,y) comprising human body detection results, as illustrated in FIG. 2. Because the microwave detection procedure can be generally deemed as a non-cooperative situation, the inputted grayscale microwave image is generally a grayscale microwave image of non-cooperation situation. In this disclosure, a grayscale microwave image of cooperation situation can also be inputted.

Figure 3:
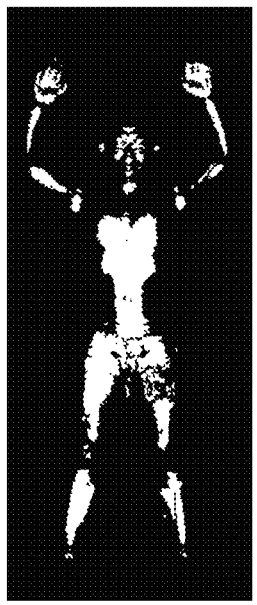
FIG. 3 illustrates a diagram of a specific embodiment of an obtained binaryzation image according to this disclosure.
Figure 4:
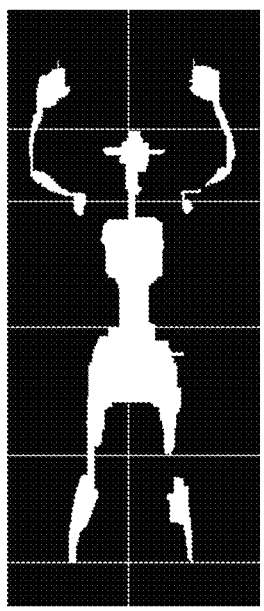
FIG. 4 illustrates a diagram of a specific embodiment of an obtained human body profile image according to this disclosure.

There are many methods to obtain human body profile image according to the inputted grayscale microwave image. For example, in an embodiment, the grayscale microwave image I (x,y) is first grayscale segmented to obtain a binary image B (x,y), as illustrated in FIG. 3. Then, morphological operations are performed on the binary image B (x,y) in the horizontal and vertical directions to generate a human body profile image $B_2$ (x,y), as illustrated in FIG. 4.

Performing grayscale segmentation on the grayscale microwave image I (x,y) to obtain the binary image B (x,y) can be achieved according to the following equation:

$$B(x, y) = \begin{cases} 255 & I(x, y) \geq T \\ 0 & I(x, y) < T \end{cases} \quad 1 \leq x \leq X, 1 \leq y \leq Y$$

wherein x is the image column number, y is the image row number, T is the threshold, B (x,y) with medium value of 255 represents the human body region.

The human body segmented from B (x,y) image is processed by morphology dilation and erosion operations in the horizontal and vertical directions, and the kernel function is a kernel of 1×3 and 3×1. The expressions of the dilation and erosion operations are respectively:

$B_2(x,y) = \max_{(x',y'):element(x',y') \neq 0} B(x+x', y+y')$ (dilation operation)

$B_2(x,y) = \min_{(x',y'):element(x',y') \neq 0} B(x+x', y+y')$ (erosion operation)

wherein x' and y' respectively represent the translation unit values corresponding to the kernel function.

In the morphology operations, the dilation operation to B (x,y) image can be made before the erosion operation to obtain the human body image $B_2$ (x,y); the dilation operation to B (x,y) image can also be made after the erosion operation to obtain the human body image $B_2$ (x,y). In order to obtain a human body profile image with smooth edge, in the morphology operation, it is preferred that in this disclosure the dilation operation to B (x,y) image is made before the erosion operation to obtain the human body image $B_2$ (x,y).

Figure 5:
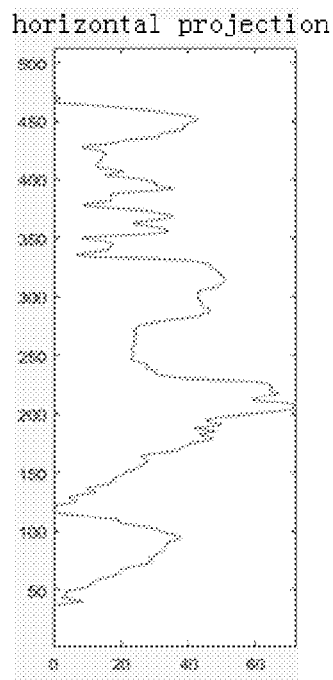
FIG. 5 illustrates a diagram of a specific embodiment of a constructed vertical direction spatial distribution histogram according to this disclosure.

In the step S120, a vertical direction spatial distribution histogram H of the human body profile image $B_2$ (x,y) is constructed, as illustrated in FIG. 5:

$$H(x) = \sum_y \delta(B_2(x, y) == 255)$$

A smoothing processing is made to the constructed vertical direction spatial distribution histogram, and the smoothing scale is 3:

$$H(x) = \begin{cases} H(x) & x < 2 \\ (H(x-1) + H(x) + H(x+1))/3 & 2 \leq x \leq X-1 \\ H(x) & x > X-1 \end{cases}$$

There are many ways to obtain the horizontal ordinates of human body vertical middle line according to the vertical direction distribution histogram. For example, in an embodiment, the steps of obtaining the horizontal ordinates of human body vertical middle line according to the vertical direction distribution histogram comprise:

S1201, extracting a vertical direction distribution sub-histogram $H_2$ of the upper half part from the vertical direction distribution histogram H;

the vertical direction distribution sub-histogram $H_2$ of the upper half part is extracted by 50% * H. Embodiments of this closure can also extract a vertical direction distribution sub-histogram of the upper half part according to other proportions and does not limit this.

S1202, obtaining the maximum of the vertical direction distribution sub-histogram $H_2$ of the upper half part:

$$x_{mid} = \max_i H_i, \min(x) \leq i \leq \max(x)$$

the column of the $x_{mid}$ is the horizontal ordinate location of human body vertical middle line, such as the vertical middle line illustrated in FIG. 4.

Other ways in existing technologies can be used to obtain the horizontal ordinates of human body vertical middle line according to the vertical direction distribution histogram, and are not illustrated here.

Figure 6:
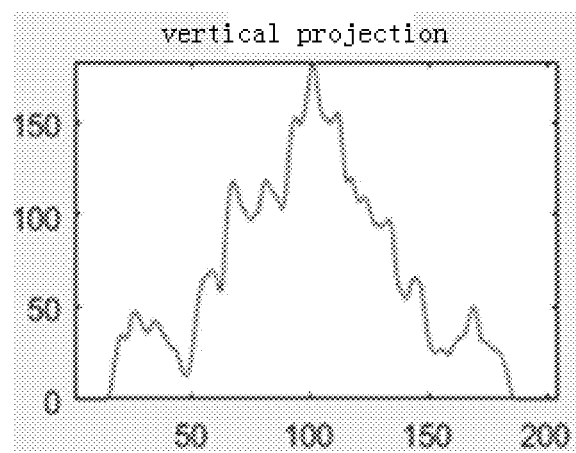
FIG. 6 illustrates a diagram of a specific embodiment of a constructed horizontal direction spatial distribution histogram according to this disclosure.

In step S130, a horizontal direction spatial distribution histogram of the human body profile image $B_2$ (x,y) is constructed, as illustrated in FIG. 6:

$$V(y) = \sum_x \delta(B_2(x, y) == 255)$$

A smoothing processing is made to the constructed horizontal direction spatial distribution histogram, and the smoothing scale is 3:

$$V(y) = \begin{cases} V(y) & y < 2 \\ (V(y-1) + V(y) + H(y+1))/3 & 2 \leq y \leq Y-1 \\ H(y) & y > Y-1 \end{cases}$$

In an embodiment, performing a local minimum detection on the horizontal direction spatial distribution histogram to obtain vertical coordinate of human body head and vertical coordinate of human body foot comprises the following steps:

S1301, a minimum detection is performed on a first local area of the horizontal direction spatial distribution histogram, and the detected minimum is determined to be the vertical coordinate $y_{head}$ of the human body head, wherein the first local area is [the horizontal ordinate location of human body vertical middle line $x_{mid-}$ a first set value, the horizontal ordinate location of human body vertical middle line $x_{mid+}$ a second set value].

wherein [ ] comprises the boundary values of two ends. The first set value and the second set value can be the same or different, which can be determined by a user according to practical requirements. For example, the size of the first local area can be determined to be 31 pixels, the first set value is the same as the second set value, then the first local area can be [$x_{mid}-15$, $x_{mid}+15$].

S1302, the number of pixels whose values equal to the preset pixel value of each row is obtained in a second local area of the horizontal direction spatial distribution histogram. The row whose number is less that a preset number is determined to be the vertical coordinate of human body foot $Y_{foot}$, wherein the second local area is [the bottom of the horizontal direction spatial distribution histogram, above the bottom and with a distance of a third set value from the bottom].

The third set value can be determined according to practical requirements. For example, the size of the second local area is determined to be 60 pixels, and the second local area is an area between the location with a distance of 60 pixels from the bottom to the bottom. The present pixel value can be 255, and when obtaining number, searching each row human body image in the second local area from up to down to find how many pixels whose values equal to 255, and counting the number. When the number is less that a threshold, the corresponding row is determined to be the location of the feed vertical coordinate $y_{foot}$.

In step S140, obtaining the human body height according to the vertical coordinate of human body head $y_{head}$ and the vertical coordinate of human body foot $y_{foot}$:

$$height = |Y_{foot} - Y_{head}|$$

In step 5150, the human body chest position comprises a human body chest vertical coordinate, a human body chest width, and a human body chest height, and the human body crotch position comprises a human body crotch vertical coordinate, a human body crotch width, and a human body crotch height. In an embodiment, obtaining the position of human body chest and the position of human body crotch with respect to the human body vertical middle line according to the human body part proportion and probability model, the human body height, the horizontal direction spatial distribution histogram and the vertical coordinate of human body head/the vertical coordinate of human body foot comprises the following steps:

obtaining the vertical coordinate of human body chest and the vertical coordinate of human body crotch according to human body part proportion and probability model, the human body height, the horizontal direction spatial distribution histogram and the vertical coordinate of human body head/the vertical coordinate of human body foot;

obtaining the human body chest width and the human body crotch width according to the human body height, the human body part proportion and probability model and the horizontal direction spatial distribution histogram;

obtaining the human body chest height and the human body crotch height according to the human body height and the human body part proportion and probability model.

It should be noted that, the vertical coordinate of human body chest and the vertical coordinate of human body crotch can be determined according to the human body part proportion and probability model, the human body height, the horizontal direction spatial distribution histogram and the vertical coordinate of human body head, and can also be determined according to the human body part proportion and probability model, the human body height, the horizontal direction spatial distribution histogram and the vertical coordinate of human body foot.

In order to better understand the implementations of the above embodiments, the method of determining human body chest location and the method of determining human body crotch location are respectively described as follows.

First, the steps for obtaining human body chest position are elaborately described.

When determining the human body chest vertical coordinate, the human body chest vertical coordinate are located roughly by the human body part proportion and probability model, and then the human body chest vertical coordinate are located precisely in combination of the local information of the horizontal direction spatial distribution histogram to obtain the precise human body chest vertical coordinate. The specific steps are as follows.

S1501, obtaining a first vertical coordinate $y_{chest}$ of human body chest according to the human body height, the ratio of the height and chest in the human body part proportion and probability model HEIGHT_CHEST_RATIO and the human body head vertical coordinate $y_{head}$/the human body foot vertical coordinate $y_{foot}$. The expression using the human body head vertical coordinate $y_{head}$ is as follow:

$$y_{chest}=\text{height}*\text{HEIGHT\_CHEST\_RATIO}+y_{head}$$

wherein HEIGHT_CHEST_RATIO is an average measured based on human body height and human body chest horizontal position in N human body microwave images, and preferably is 0.8. The first vertical coordinate $y_{chest}$ of human body chest is the obtained rough human body chest vertical coordinate.

It should be noted that, a user also can take the human body foot vertical coordinate as the reference point to determine the first vertical coordinate of human body chest, and this disclosure does not limit this.

S1502, obtaining a peak area near the first vertical coordinate of human body chest according to the horizontal direction spatial distribution histogram, and determining the vertical coordinate corresponding to the peak area as a second vertical coordinate of human body chest, wherein the distance between the peak area and the first vertical coordinate of human body chest is less than a first distance threshold.

Due the human body chest imaging characteristic, there is a peak area in the horizontal direction spatial distribution histogram near the rough human body chest vertical coordinate, whose vertical coordinate is $y'_{chest}$, i.e., the second vertical coordinate of human body chest.

S1503, obtaining the vertical coordinate of human body chest $y^*_{chest}$ according to the first vertical coordinate of human body chest and the second vertical coordinate of human body chest, which is expressed as follow:

$$y^*_{chest}=(y_{chest}+y'_{chest})/2$$

When determining the human body chest width, the human body chest width is roughly estimated by the human body part proportion and probability model, and then the human body chest width is precisely calculated in combination with the local information of the horizontal direction spatial distribution histogram, which are respectively as follows:

S1504, obtaining a first human body chest width $w_{chest}$ according to the human body height height and the ratio of the height and chest width in the human body part proportion and probability model HEIGHT_CHEST_WIDTH_RATIO;

$$w_{chest}=\text{height}*\text{HEIGHT\_CHEST\_WIDTH\_RATIO}$$

wherein HEIGHT_CHEST_WIDTH_RATIO is an average measured based on human body height and chest width in N human body microwave images, and preferably is 0.24.

S1505, obtaining the boundary information of the horizontal direction spatial distribution histogram at the second vertical coordinate of the human body chest, and obtaining a second human body chest width according to the boundary information.

Due to the human body chest's imaging characteristic, there is a peak area vertical coordinate $y'_{chest}$ in the horizontal direction spatial distribution histogram V near the rough chest vertical coordinate, and the width of the horizontal direction spatial distribution histogram V at location $y'_{chest}$ is $w'_{chest}$, that is, the second chest width $w'_{chest}$ is obtained. $w'_{chest}$ is approximate to the actual value.

S1506, obtaining human body chest width according to the first human body chest width, the second human body chest width and a first preset redundancy.

In order to improve the robustness to noise, a redundancy $\Delta_{chest}$ is added, and the preferred typical value is 3 pixels. Then the human body chest width can be obtained according to the following expression:

$$w^*_{chest}=(w'_{chest}+w_{chest})/2+\Delta_{chest}$$

When determining the human body chest height, the human body chest height range is roughly estimated by the human body part proportion and probability model to obtain the human body chest height $l_{chest}$, which is expressed as:

$$l_{chest}=\text{height}*\text{HEIGHT\_CHEST\_HEIGHT\_RATIO}$$

wherein HEIGHT_CHEST_HEIGHT_RATIO is an average measured based on human body height and chest height in N human body microwave images, and preferably is 0.13.

Next, the steps for obtaining human body crotch position are elaborately described as follows.

When determining the human body crotch vertical coordinate, the human body crotch vertical coordinate are located roughly by the human body part proportion and probability model, and then the human body crotch vertical coordinate are located precisely in combination of the local information of the horizontal direction spatial distribution histogram to obtain the precise human body crotch vertical coordinate. The specific steps are as follows.

S150-1, obtaining a first vertical coordinate $y_{crotch}$ of human body crotch according to the human body height height, the ratio of the height and crotch in the human body part proportion and probability model HEIGHT_CROTCH_RATIO and the human body head vertical coordinate $y_{head}$/the human body foot vertical coordinate $y_{foot}$. The expression using the human body head vertical coordinate $y_{head}$ is as follow:

$$y_{crotch}=\text{height}*\text{HEIGHT\_CROTCH\_RATIO}+y_{head}$$

wherein HEIGHT_CROTCH_RATIO is an average measured based on human body height and human body crotch horizontal position in N human body microwave images, and preferably is 0.51. The first vertical coordinate $y_{crotch}$ of human body crotch is the obtained rough human body crotch vertical coordinate.

It should be noted that, a user also can take the human body foot vertical coordinate as the reference point to determine the first vertical coordinate of human body crotch, and this disclosure does not limit this.

S150-2, obtaining a peak area near the first vertical coordinate of human body crotch according to the horizontal direction spatial distribution histogram, and determining the vertical coordinate corresponding to the peak area as a second vertical coordinate of human body crotch, wherein the distance between the peak area and the first vertical coordinate of human body crotch is less than a second distance threshold.

Due the human body crotch imaging characteristic, there is a peak area in the horizontal direction spatial distribution histogram near the rough human body crotch vertical coordinate, whose vertical coordinate is $y'_{crotch}$, i.e., the second vertical coordinate of human body crotch.

S150-3, obtaining the vertical coordinate of human body crotch $y^*_{crotch}$ according to the first vertical coordinate of human body crotch and the second vertical coordinate of human body crotch, which is expressed as follow:

$$y^*_{crotch}=(y_{crotch}+y'_{crotch})/2$$

When determining the human body chestcrotch width, the human body crotch width is roughly estimated by the human body part proportion and probability model, and then the human body crotch width is precisely calculated in combination with the local information of the horizontal direction spatial distribution histogram, which are respectively as follows.

S150-4, obtaining a first human body crotch width $w_{crotch}$ according to the human body height height and the ratio of the height and crotch width in the human body part proportion and probability model HEIGHT_CROTCH_WIDTH_RATIO;

$w_{crotch}$=height*HEIGHT_CROTCH_WIDTH_RATIO wherein HEIGHT_CROTCH_WIDTH_RATIO is an average measured based on human body height and crotch width in N human body microwave images, and preferably is 0.14.

S150-5, obtaining the boundary information of the horizontal direction spatial distribution histogram at the second vertical coordinate of the human body crotch, and obtaining a second human body crotch width according to the boundary information.

Due to the human body crotch's imaging characteristic, there is a peak area vertical coordinate $y'_{crotch}$ in the horizontal direction spatial distribution histogram V near the rough crotch vertical coordinate, and the width of the horizontal direction spatial distribution histogram V at location $y'_{crotch}$ is $w'_{crotch}$, that is, the second crotch width $w'_{crotch}$ is obtained. $w'_{crotch}$ crotch is approximate to the actual value.

S150-6, obtaining human body crotch width according to the first human body crotch width, the second human body crotch width and a second preset redundancy.

In order to improve the robustness to noise, a redundancy $\Delta_{crotch}$ is added, and the preferred typical value is 3 pixels. Then the human body crotch width can be obtained according to the following expression:

$w^*_{crotch}=(w'_{crotch}+w_{crotch})/2+\Delta_{crotch}$

When determining the human body crotch height, the human body crotch height range is roughly estimated by the human body part proportion and probability model to obtain the human body crotch height $l_{crotch}$, which is expressed as:

$l_{crotch}$=height*HEIGHT_CROTCH_HEIGHT_RATIO wherein HEIGHT_CROTCH_HEIGHT_RATIO is an average measured based on human body height and crotch height in N human body microwave images, and preferably is 0.13.

Figure 7:
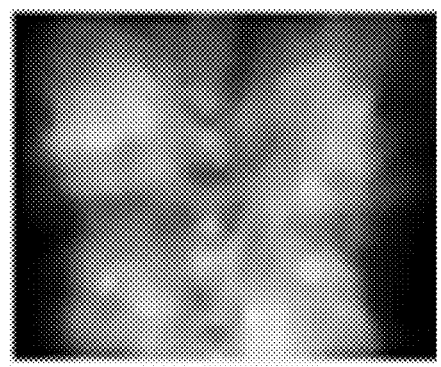
FIG. 7 illustrates a diagram of a specific embodiment of an extracted subimage of human body chest according to this disclosure.
Figure 8:
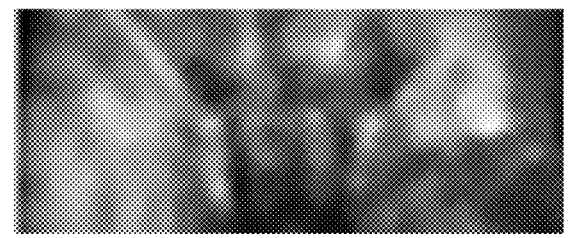
FIG. 8 illustrates a diagram of a specific embodiment of an extracted subimage of human body crotch according to this disclosure.

In step S160, extracting the subimage of human body chest and the subimage of human body crotch respectively by average gray-scale variance feature. The extracted subimage of human body chest is illustrated in FIG. 7, and the extracted subimage of human body crotch is illustrated in FIG. 8.

In an embodiment, extracting the subimage of human body chest according to the horizontal coordinate of human body vertical middle line and the position of human body chest comprises the following steps: extracting the subimage of human body chest centering on coordinate (the horizontal coordinate of human body vertical middle line, the vertical coordinate of human body chest), wherein the vertical height range of the human body chest subimage is [the vertical coordinate of human body chest−the height of human body chest/2, the vertical coordinate of human body chest+the height of human body chest/2], and the horizontal width range of the human body chest subimage is [the horizontal coordinate of human body vertical middle line−the width of human body chest/2, the horizontal coordinate of human body vertical middle line+the width of human body chest/2].

The center of human body chest subimage is position of human body vertical middle line, and the coordinate are $(x_{mid}, y^*_{chest})$. The vertical height range is $y \in [y^*_{chest}/2, y^*_{chest}+l_{chest}/2]$ and the horizontal width range is $x \in [x_{mid}-w^*_{chest}/2, x_{mid}+w^*_{chest}/2]$.

In an embodiment, extracting the subimage of human body crotch according to the horizontal coordinate of human body vertical middle line and the position of human body crotch comprises the following steps:

extracting the subimage of human body crotch centering on coordinate (the horizontal coordinate of human body vertical middle line, the vertical coordinate of human body crotch), wherein the vertical height range of the human body crotch subimage is [the vertical coordinate of human body crotch−the height of human body crotch/2, the vertical coordinate of human body crotch+the height of human body crotch/2], and the horizontal width range of the human body crotch subimage is [the horizontal coordinate of human body vertical middle line−the width of human body crotch/2, the horizontal coordinate of human body vertical middle line+the width of human body crotch/2].

The center of human body crotch subimage is position of human body vertical middle line, and the coordinate are $(x_{mid}, y^*_{crotch})$. The vertical height range is $y \in [y^*_{crotch}-l_{crotch}/2, y^*_{crotch}+l_{crotch}/2]$, and the horizontal width range is $x \in [x_{mid}-w^*_{crotch}/2, x_{mid}+w^*_{crotch}/2]$.

In step S170, the extracted human body chest subimage and human body crotch subimage are compressed to a fixed template size, for example, the template size of chest image is 80 pixels*60 pixels, and the template size of crotch image is 50 pixels*50 pixels. The chest feature value of human body chest subimage and the crotch feature value of human body crotch subimage are respectively calculated. The human gender is determined according to the feature threshold $T_{gender}$ obtained from N images, and the expressions are as follows:

$$\begin{cases} \text{feature\_value} < T_{gender} & \text{Female} \\ \text{feature\_value} = T_{gender} & \text{Unknow} \\ \text{feature\_value} > T_{gender} & \text{Male} \end{cases}$$

wherein feature_value represents the chest feature value or the crotch feature value, $T_{gender}$ represents the chest feature threshold $T_{chest}$ or the crotch feature threshold $T_{crotch}$. Preferably, the average value of the chest feature threshold $T_{chest}$ is 2.5, and the standard deviation is 17; the average value of the crotch feature threshold $T_{crotch}$ is 3.7, and the standard deviation is 23.

Female represents female, Unkown represents unidentified, and male represents male.

In an embodiment, detecting human body gender according to the chest feature value and the crotch feature value may comprise the following steps:

selecting the chest feature threshold from a preset chest feature threshold interval [a minimum chest feature threshold, a maximum chest feature threshold], the selected chest feature threshold is regarded as a current chest feature threshold; the chest feature threshold is obtained by the maximum between-class variance method (OTSU);

comparing the chest feature value with the current chest feature threshold;

if the chest feature value is less than the current chest feature threshold, the result of chest gender detection is female; if the chest feature value is equal to the current chest feature threshold, the result of chest gender detection is neutral; and if the chest feature value is greater than the current chest feature threshold, the result of chest gender detection is male;

selecting the crotch feature threshold from a preset crotch feature threshold interval [a minimum crotch feature threshold, a maximum crotch feature threshold], the selected crotch feature threshold is regarded as a current crotch feature threshold; the crotch feature threshold is obtained by the maximum between-class variance method (OTSU);

comparing the crotch feature value with the current crotch feature threshold;

if the crotch feature value is less than the current crotch feature threshold, the result of crotch gender detection is female; if the crotch feature value is equal to the current crotch feature threshold, the result of crotch gender detection is neutral; and if the crotch feature value is greater than the current crotch feature threshold, the result of crotch gender detection is male;

if the gender of chest detection is the same as the gender of crotch detection, the gender of chest detection or crotch detection is determined to be the human body gender;

if the gender of chest detection is different from the gender of crotch detection, comparing the deviation degree of the chest feature value with that of the crotch feature value, and determining the gender corresponding to the greater feature value deviation degree to be the human body gender, wherein the deviation degree of the chest feature value is |the current chest feature threshold−the chest feature value|/the chest feature threshold interval, and the deviation degree of the crotch feature value is |the current crotch feature threshold−the crotch feature value|/the crotch feature threshold interval, the chest feature threshold interval is |the maximum chest feature threshold−the minimum chest feature threshold|, and the crotch feature threshold interval is |the maximum crotch feature threshold−the minimum crotch feature threshold|.

In order to better understand the above gender detection method, a specific embodiment is elaborately described as follow.

The chest feature value is $V_{chest}$, the chest feature threshold interval is $[T_{chest-min}, T_{chest-max}]$. A chest feature threshold $T_{chest}$ is selected from the chest feature threshold interval, then the deviation degree of the chest feature value $A=|T_{chest}-V_{chest}|/|T_{chest-max}-T_{chest-min}|$, The crotch feature value is $V_{crotch}$, the crotch feature threshold interval is $[T_{crotch-min}, T_{crotch-max}]$. A crotch feature threshold $T_{crotch}$ is selected from the crotch feature threshold interval, then the deviation degree of the crotch feature value $B=|T_{crotch}-V_{crotch}|/|T_{crotch-max}-T_{crotch-min}|$.

If the gender detected according to the chest feature value $V_{chest}$ is female, and the gender detected according to the crotch feature value $V_{crotch}$ is female, then the human body gender is determined to be female. If the gender detected according to the chest feature value $V_{chest}$ is female, the gender detected according to the crotch feature value $V_{crotch}$ is male, and the deviation degree of crotch feature value is greater than that of chest feature value, which means that the crotch detection result is more accurate, and the human body gender is determined to be male.

Based on the same disclosure concept, this disclosure also provides a device for human body gender detection in a microwave image. Next, the embodiment of this device is described in detail in combination with accompany drawings.

As illustrated in FIG. 9, a device for human body gender detection in a microwave image comprising:

a human body profile image acquiring module 110 configured to acquire a grayscale microwave image comprising human body detection results, and obtain a human body profile image from the grayscale microwave image;

a vertical middle line horizontal coordinate obtaining module 120 configured to construct a vertical direction spatial distribution histogram of the human body profile image, and obtain horizontal coordinate of human body vertical middle line according to the vertical direction spatial distribution histogram;

a head and foot coordinate obtaining module 130 configured to construct a horizontal direction spatial distribution histogram of the human body profile image, perform a local minimum detection on the horizontal direction spatial distribution histogram to obtain vertical coordinate of human body head and vertical coordinate of human body foot;

a human body height obtaining module 140 configure to obtain the human body height according to the vertical coordinate of human body head and the vertical coordinate of human body foot;

a chest and crotch position obtaining module 150 configured to obtain the position of human body chest and the position of human body crotch with respect to the human body vertical middle line according to human body part proportion and probability model, the human body height, the horizontal direction spatial distribution histogram and the vertical coordinate of human body head/the vertical coordinate of human body foot;

a gender feature subimage extracting module 160 configured to extract a subimage of human body chest according to the horizontal coordinate of human body vertical middle line and the position of human body chest, and extract a subimage of human body crotch according to the horizontal coordinate of human body vertical middle line and the position of human body crotch;

a gender detection module 170 configured to obtain a chest feature value of the subimage of human body chest and a crotch feature value of the subimage of human body crotch, and detect human body gender according to the chest feature value and the crotch feature value.

In an embodiment, as illustrated in FIG. 10, the chest and crotch position obtaining module 150 may comprise:

a chest and crotch vertical coordinate obtaining unit 1501 configured to obtain the vertical coordinate of human body chest and the vertical coordinate of human body crotch according to the human body part proportion and probability model, the human body height, the horizontal direction spatial distribution histogram and the vertical coordinate of human body head/the vertical coordinate of human body foot;

a chest and crotch width obtaining unit 1502 configured to obtain the width of human body chest and the width of human body crotch according to the human body height, the human body part proportion and probability model and the horizontal direction spatial distribution histogram;

a chest and crotch height obtaining unit 1503 configured to obtain the human body chest height and the human body crotch height according to the human body height and the human body part proportion and probability model.

The other technical features of this device in this disclosure is the same as those of the method, and hence not repeat here.

The technical solution of this disclosure is simple, and after experimental verification, can be effectively applied in actual microwave security check system. This technical solution has high real time and high robustness, and its correct recognition rate meets the operating requirements.

As such, the problem of how to identify human body gender in real time and accurately in a microwave security check system is solved. Besides, because the present disclosure can accurately locate the chest position and the crotch position of a human body, the human body's private part can be shielded and protected effectively according to this disclosure.

All technical features of the above embodiments can be combined arbitrarily, and for simplicity, not all possible combinations of the technical features in the above embodiments are described. However, if there is no contradiction, all the combinations of these technical features should be regarded as the scope recited in this specification.

The above embodiments merely express several implementation ways of this disclosure. The description is specific and in detail, but cannot be construed as a limit to this disclosure. It should be noted that, persons skilled in the art can make various modifications and alternatives to this disclosure with departing from the spirit of this disclosure, which belong to the scope of this disclosure. Therefore, the scope of this disclosure must be determined according to the accompanying claims.

The invention claimed is:

1. A method of human body gender detection in a microwave image, the method comprising:
   acquiring a grayscale microwave image comprising human body detection results, and obtaining a human body profile image from the grayscale microwave image;
   constructing a vertical direction spatial distribution histogram of the human body profile image, and obtaining a horizontal coordinate of a human body vertical middle line according to the vertical direction spatial distribution histogram;
   constructing a horizontal direction spatial distribution histogram of the human body profile image, performing a local minimum detection on the horizontal direction spatial distribution histogram to obtain a vertical coordinate of a human body head and a vertical coordinate of a human body foot;
   obtaining a human body height according to the vertical coordinate of the human body head and the vertical coordinate of the human body foot;
   obtaining a position of a human body chest and a position of a human body crotch with respect to the human body vertical middle line according to a human body part proportion and a probability model, the human body height, the horizontal direction spatial distribution histogram, the vertical coordinate of the human body head, and the vertical coordinate of the human body foot;
   extracting a subimage of the human body chest according to the horizontal coordinate of human body vertical middle line and the position of the human body chest, and extracting a subimage of the human body crotch according to the horizontal coordinate of human body vertical middle line and the position of the human body crotch;
   obtaining a chest feature value of the subimage of the human body chest and a crotch feature value of the subimage of the human body crotch, and detecting human a body gender according to the chest feature value and the crotch feature value.

2. The method of human body gender detection in a microwave image of claim 1, wherein the step of performing a local minimum detection on the horizontal direction spatial distribution histogram to obtain the vertical coordinate of the human body head and the vertical coordinate of the human body foot comprises:
   performing a minimum detection on a first local area of the horizontal direction spatial distribution histogram, and determining the detected minimum to be the vertical coordinate of the human body head, wherein the first local area is from approximately (the horizontal ordinate location of the human body vertical middle line−a first set value) to approximately (the horizontal ordinate location of the human body vertical middle line+a second set value);
   obtaining the number of pixels whose values equal to the preset pixel value of each row in a second local area of the horizontal direction spatial distribution histogram, and determining the row whose number is less that a preset number to be the vertical coordinate of the human body foot, wherein the second local area is from approximately (the bottom of the horizontal direction spatial distribution histogram) to approximately (above the bottom and with a distance of a third set value from the bottom]).

3. The method of human body gender detection in a microwave image of claim 1, wherein the step of obtaining the position of the human body chest and the position of the human body crotch with respect to the human body vertical middle line according to the human body part proportion and probability model, the human body height, the horizontal direction spatial distribution histogram and the vertical coordinate of human body head, and the vertical coordinate of human body foot, comprises:
   obtaining the vertical coordinate of the human body chest and the vertical coordinate of the human body crotch according to the human body part proportion and probability model, the human body height, the horizontal direction spatial distribution histogram, the vertical coordinate of the human body head, and the vertical coordinate of human body foot;
   obtaining the human body chest width and the human body crotch width according to the human body height, the human body part proportion and probability model and the horizontal direction spatial distribution histogram;
   obtaining the human body chest height and the human body crotch height according to the human body height and the human body part proportion and probability model.

4. The method of human body gender detection in a microwave image of claim 3, wherein:
   the step of obtaining the vertical coordinate of the human body chest according to the human body part proportion and probability model, the human body height, the horizontal direction spatial distribution histogram, the vertical coordinate of the human body head, and the vertical coordinate of the human body foot comprises:
   obtaining a first vertical coordinate of the human body chest according to the human body height, the ratio of the height and chest in the human body part proportion and probability model, the human body head vertical coordinate, and the human body foot vertical coordinate;
   obtaining a peak area near the first vertical coordinate of the human body chest according to the horizontal direction spatial distribution histogram, and determining the vertical coordinate corresponding to the peak area as a second vertical coordinate of the human body chest, wherein the distance between the peak area and the first vertical coordinate of the human body chest is less that a first distance threshold;

obtaining the vertical coordinate of the human body chest according to the first vertical coordinate of the human body chest and the second vertical coordinate of the human body chest;

the step of obtaining the vertical coordinate of the human body crotch according to the human body part proportion and probability model, the human body height, the horizontal direction spatial distribution histogram and (the vertical coordinate of the human body head)/ the vertical coordinate of the human body foot comprises:

obtaining a first vertical coordinate of the human body crotch according to the human body height, the ratio of the height and crotch in the human body part proportion and probability model, the human body head vertical coordinate, and the human body foot vertical coordinate;

obtaining a peak area near the first vertical coordinate of the human body crotch according to the horizontal direction spatial distribution histogram, and determining the vertical coordinate corresponding to the peak area as a second vertical coordinate of the human body crotch, wherein the distance between the peak area and the first vertical coordinate of the human body crotch is less that a second distance threshold;

obtaining the vertical coordinate of the human body crotch according to the first vertical coordinate of the human body crotch and the second vertical coordinate of the human body crotch.

5. The method of human body gender detection in a microwave image of claim 3, wherein:

the step of obtaining the human body chest width according to the human body height, the human body part proportion and probability model and the horizontal direction spatial distribution histogram comprises:

obtaining a first human body chest width according to the human body height and the ratio of the height and chest width in the human body part proportion and probability model;

obtaining the boundary information of the horizontal direction spatial distribution histogram at the second vertical coordinate of the human body chest, and obtaining a second human body chest width according to the boundary information;

obtaining the human body chest width according to the first human body chest width, the second human body chest width and a first preset redundancy;

the step of obtaining the human body crotch width according to the human body height, the human body part proportion and probability model and the horizontal direction spatial distribution histogram comprises:

obtaining a first human body crotch width according to the human body height and the ratio of the height and crotch width in the human body part proportion and probability model;

obtaining the boundary information of the horizontal direction spatial distribution histogram at the second vertical coordinate of the human body crotch, and obtaining a second human body crotch width according to the boundary information;

obtaining human body crotch width according to the first human body crotch width, the second human body crotch width and a second preset redundancy.

6. The method of human body gender detection in a microwave image of claim 3, wherein:

the step of obtaining the human body chest height and the human body crotch height according to the human body height and the human body part proportion and probability model comprises:

obtaining the human body chest height according to the human body height and the ratio of the height and chest height in the human body part proportion and probability model;

obtaining the human body crotch height according to the human body height and the ratio of the height and crotch height in the human body part proportion and probability model.

7. The method of human body gender detection in a microwave image of any one of claim 6, wherein:

the step of extracting a subimage of the human body chest according to the horizontal coordinate of human body vertical middle line and the position of human body chest comprises:

extracting the subimage of the human body chest centering on coordinate (the horizontal coordinate of human body vertical middle line, the vertical coordinate of the human body chest), wherein the vertical height range of the human body chest subimage is from approximately (the vertical coordinate of the human body chest–(the height of the human body chest)/2) to approximately (the vertical coordinate of human body chest+(the height of human body chest)/2), and the horizontal width range of the human body chest subimage is from approximately (the horizontal coordinate of human body vertical middle line–(the width of human body chest)/2) to approximately (the horizontal coordinate of human body vertical middle line+the width of human body chest)/2);

the step of extracting a subimage of human body crotch according to the horizontal coordinate of human body vertical middle line and the position of human body crotch comprises:

extracting the subimage of human body crotch centering on coordinate (the horizontal coordinate of human body vertical middle line, the vertical coordinate of human body crotch), wherein the vertical height range of the human body crotch subimage is from approximately (the vertical coordinate of human body crotch–(the height of human body crotch)/2) to approximately (the vertical coordinate of human body crotch+(the height of human body crotch)/2), and the horizontal width range of the human body crotch subimage is from approximately (the horizontal coordinate of human body vertical middle line–(the width of human body crotch)/2) to approximately (the horizontal coordinate of human body vertical middle line+(the width of human body crotch)/2).

8. The method of human body gender detection in a microwave image of claim 1, wherein the step of detecting human body gender according to the chest feature value and the crotch feature value comprises:

selecting the chest feature threshold from a preset chest feature threshold interval from approximately (a minimum chest feature threshold) to approximately (a maximum chest feature threshold), the selected chest feature threshold is regarded as a current chest feature threshold;

comparing the chest feature value with the current chest feature threshold;

if the chest feature value is less than the current chest feature threshold, the result of chest gender detection is female; if the chest feature value is equal to the current chest feature threshold, the result of chest gender detection is neutral; and if the chest feature value is greater than the current chest feature threshold, the result of chest gender detection is male;

selecting the crotch feature threshold from a preset crotch feature threshold interval from approximately (a minimum crotch feature threshold) to approximately (a maximum crotch feature threshold), wherein the selected crotch feature threshold is regarded as a current crotch feature threshold;

comparing the crotch feature value with the current crotch feature threshold;

if the crotch feature value is less than the current crotch feature threshold, the result of crotch gender detection is female; if the crotch feature value is equal to the current crotch feature threshold, the result of crotch gender detection is neutral; and if the crotch feature value is greater than the current crotch feature threshold, the result of crotch gender detection is male;

if the gender of chest detection is the same as the gender of crotch detection, the gender of chest detection or crotch detection is determined to be the human body gender;

if the gender of chest detection is different from the gender of crotch detection, comparing the deviation degree of the chest feature value with that of the crotch feature value, and determining the gender corresponding to the greater feature value deviation degree to be the human body gender, wherein the deviation degree of the chest feature value is |the current chest feature threshold−the chest feature value|/the chest feature threshold interval, and the deviation degree of the crotch feature value is |the current crotch feature threshold−the crotch feature value|/the crotch feature threshold interval, the chest feature threshold interval is |the maximum chest feature threshold−the minimum chest feature threshold|, and the crotch feature threshold interval is |the maximum crotch feature threshold−the minimum crotch feature threshold|.

9. A device of human body gender detection in a microwave image, the device comprising:
a human body profile image acquiring device configured to acquire a grayscale microwave image comprising human body detection results, and obtain a human body profile image from the grayscale microwave image;
a vertical middle line horizontal coordinate obtaining device configured to construct a vertical direction spatial distribution histogram of the human body profile image, and obtain horizontal coordinate of human body vertical middle line according to the vertical direction spatial distribution histogram;
a head and foot coordinate obtaining device configured to construct a horizontal direction spatial distribution histogram of the human body profile image, perform a local minimum detection on the horizontal direction spatial distribution histogram to obtain vertical coordinate of human body head and vertical coordinate of human body foot;
a human body height obtaining device configure to obtain the human body height according to the vertical coordinate of human body head and the vertical coordinate of human body foot;
a chest and crotch position obtaining device configured to obtain the position of the human body chest and the position of human body crotch with respect to the human body vertical middle line according to a human body part proportion and probability model, the human body height, the horizontal direction spatial distribution histogram and the vertical coordinate of human body head / the vertical coordinate of human body foot;
a gender feature subimage extracting moduledevice configured to extract a subimage of the human body chest according to the horizontal coordinate of human body vertical middle line and the position of the human body chest, and extract a subimage of human body crotch according to the horizontal coordinate of human body vertical middle line and the position of human body crotch;
a gender detection device configured to obtain a chest feature value of the subimage of the human body chest and a crotch feature value of the subimage of human body crotch, and detect human body gender according to the chest feature value and the crotch feature value.

10. The device of human body gender detection in a microwave image of claim 9, wherein the chest and crotch position obtaining device comprises:
a chest and crotch vertical coordinate obtaining controller configured to obtain the vertical coordinate of the human body chest and the vertical coordinate of human body crotch according to the human body part proportion and probability model, the human body height, the horizontal direction spatial distribution histogram and the vertical coordinate of human body head/the vertical coordinate of human body foot;
a chest and crotch width obtaining controller configured to obtain the width of the human body chest and the width of human body crotch according to the human body height, the human body part proportion and probability model and the horizontal direction spatial distribution histogram;
a chest and crotch height obtaining controller configured to obtain the human body chest height and the human body crotch height according to the human body height and the human body part proportion and probability model.

11. The method of human body gender detection in a microwave image of claim 3, wherein:
the step of extracting a subimage of the human body chest according to the horizontal coordinate of human body vertical middle line and the position of the human body chest comprises:
extracting the subimage of the human body chest centering on coordinate (the horizontal coordinate of human body vertical middle line, the vertical coordinate of the human body chest), wherein the vertical height range of the human body chest subimage is from approximately (the vertical coordinate of the human body chest−(the height of human body chest)/2) to approximately (the vertical coordinate of human body chest+(the height of human body chest)/2) and the horizontal width range of the human body chest subimage is from approximately (the horizontal coordinate of human body vertical middle line−(the width of human body chest)/2) to approximately (the horizontal coordinate of human body vertical middle line+(the width of human body chest)/2);
the step of extracting a subimage of human body crotch according to the horizontal coordinate of human body vertical middle line and the position of human body crotch comprises:
extracting the subimage of human body crotch centering on coordinate (the horizontal coordinate of human body vertical middle line, the vertical coordinate of human body crotch), wherein the vertical height range of the human body crotch subimage is from approximately (the vertical coordinate of human body crotch–(the height of human body crotch)/2) to approximately (the vertical coordinate of human body crotch+(the height of human body crotch/2), and the horizontal width range of the human body crotch subimage is from approximately (the horizontal coordinate of human body vertical middle line–(the width of human body crotch)/2) to approximately (the horizontal coordinate of human body vertical middle line+(the width of human body crotch)/2).

12. The method of human body gender detection in a microwave image of claim 5, wherein:
   the step of extracting a subimage of the human body chest according to the horizontal coordinate of human body vertical middle line and the position of the human body chest comprises:
   extracting the subimage of the human body chest centering on coordinate (the horizontal coordinate of human body vertical middle line, the vertical coordinate of the human body chest), wherein the vertical height range of the human body chest subimage is from approximately (the vertical coordinate of the human body chest–(the height of the human body chest)/2) to approximately (the vertical coordinate of the human body chest+(the height of the human body chest/2), and the horizontal width range of the human body chest subimage is from approximately (the horizontal coordinate of human body vertical middle line–(the width of the human body chest)/2) to approximately (the horizontal coordinate of human body vertical middle line+(the width of human body chest)/2);
   the step of extracting a subimage of human body crotch according to the horizontal coordinate of human body vertical middle line and the position of human body crotch comprises:
   extracting the subimage of human body crotch centering on coordinate (the horizontal coordinate of human body vertical middle line, the vertical coordinate of human body crotch), wherein the vertical height range of the human body crotch subimage is from approximately (the vertical coordinate of human body crotch–(the height of human body crotch)/2) to approximately (the vertical coordinate of human body crotch+(the height of human body crotch)/2), and the horizontal width range of the human body crotch subimage is from approximately (the horizontal coordinate of human body vertical middle line–(the width of human body crotch)/2) to approximately (the horizontal coordinate of human body vertical middle line+(the width of human body crotch)/2).

13. The method of human body gender detection in a microwave image of claim 7, wherein:
   the step of extracting a subimage of the human body chest according to the horizontal coordinate of human body vertical middle line and the position of the human body chest comprises:
   extracting the subimage of the human body chest centering on coordinate (the horizontal coordinate of human body vertical middle line, the vertical coordinate of the human body chest), wherein the vertical height range of the human body chest subimage is from approximately (the vertical coordinate of the human body chest–(the height of the human body chest)/2) to approximately (the vertical coordinate of the human body chest+(the height of the human body chest)/2), and the horizontal width range of the human body chest subimage is from approximately (the horizontal coordinate of human body vertical middle line–(the width of the human body chest)/2)) to approximately (the horizontal coordinate of human body vertical middle line+(the width of the human body chest)/2));
   the step of extracting a subimage of human body crotch according to the horizontal coordinate of human body vertical middle line and the position of human body crotch comprises:
   extracting the subimage of human body crotch centering on coordinate (the horizontal coordinate of human body vertical middle line, the vertical coordinate of human body crotch), wherein the vertical height range of the human body crotch subimage is from approximately (the vertical coordinate of human body crotch–(the height of human body crotch)/2) to approximately (the vertical coordinate of human body crotch+(the height of human body crotch)/2), and the horizontal width range of the human body crotch subimage is from approximately (the horizontal coordinate of human body vertical middle line–(the width of human body crotch)/2) to approximately (the horizontal coordinate of human body vertical middle line+(the width of human body crotch)/2).

* * * * *